United States Patent
Zhao

(10) Patent No.: US 9,535,303 B2
(45) Date of Patent: Jan. 3, 2017

(54) LIQUID CRYSTAL DISPLAY DEVICE

(71) Applicant: BOE TECHNOLOGY GROUP CO., LTD., Beijing (CN)

(72) Inventor: Weili Zhao, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/429,011

(22) PCT Filed: Jun. 26, 2014

(86) PCT No.: PCT/CN2014/080850
§ 371 (c)(1),
(2) Date: Mar. 18, 2015

(87) PCT Pub. No.: WO2015/109751
PCT Pub. Date: Jul. 30, 2015

(65) Prior Publication Data
US 2016/0026014 A1  Jan. 28, 2016

(30) Foreign Application Priority Data
Jan. 23, 2014 (CN) .......................... 2014 1 0033334

(51) Int. Cl.
*G02F 1/1347* (2006.01)
*G02F 1/1337* (2006.01)
(Continued)

(52) U.S. Cl.
CPC ........... *G02F 1/137* (2013.01); *G02F 1/13363* (2013.01); *G02F 1/13471* (2013.01);
(Continued)

(58) Field of Classification Search
CPC G02F 1/13471; G02F 1/1347; G02F 1/13473; G02F 1/13718; G02F 1/141; G02F 1/1393; G02F 1/13707; G02F 2001/133742; G02F 1/134363; G02F 1/136213
(Continued)

(56) References Cited

U.S. PATENT DOCUMENTS 7,760,292 B2 * 7/2010 Jin .......................... G02F 1/1323
349/102
2006/0285040 A1 * 12/2006 Kobayashi ............ G02F 1/1323
349/117
(Continued)

FOREIGN PATENT DOCUMENTS

CN          1651981        8/2005
CN          1949349        4/2007
(Continued)

OTHER PUBLICATIONS

International Search Report and Written Opinion from PCT/CN14/080850 dated Oct. 27, 2014.
(Continued)

*Primary Examiner* — Lucy Chien
(74) *Attorney, Agent, or Firm* — Calfee, Halter & Griswold LLP

(57) ABSTRACT

The present invention provides a liquid crystal display device, the liquid crystal display device comprising an upper polarizer, a lower polarizer and a first liquid crystal cell arranged between the upper polarizer and the lower polarizer, wherein a second liquid crystal cell is further arranged between the upper polarizer and the first liquid crystal cell, the second liquid crystal cell comprising a first electrode, a second electrode and a first liquid crystal layer arranged between the first electrode and the second electrode, the first liquid crystal layer being a blue phase liquid crystal layer, the first electrode and the second electrode being used for forming a vertical electric field. The present invention can (Continued)

realize switching between a wide view mode and a narrow view mode of the liquid crystal display device.

12 Claims, 2 Drawing Sheets

(51) Int. Cl.
 *G02F 1/1343* (2006.01)
 *G02F 1/137* (2006.01)
 *G02F 1/1335* (2006.01)
 *G02F 1/13363* (2006.01)

(52) U.S. Cl.
 CPC .. *G02F 1/133528* (2013.01); *G02F 1/134309* (2013.01); *G02F 1/134363* (2013.01); *G02F 2001/13793* (2013.01)

(58) Field of Classification Search
 USPC .......................................... 349/74, 141, 130
 See application file for complete search history.

(56) References Cited

U.S. PATENT DOCUMENTS

| | | | |
|---|---|---|---|
| 2007/0002230 A1* | 1/2007 | Jang | G02F 1/1323 349/117 |
| 2007/0085957 A1* | 4/2007 | Jin | G02F 1/1323 349/141 |
| 2008/0165297 A1 | 7/2008 | Matsushima | |
| 2009/0174843 A1* | 7/2009 | Sakai | G02F 1/13471 349/74 |
| 2010/0110345 A1* | 5/2010 | Sakai | G02F 1/133634 349/96 |
| 2010/0128200 A1* | 5/2010 | Morishita | G02F 1/1323 349/62 |
| 2011/0059670 A1 | 3/2011 | Jin et al. | |
| 2011/0285929 A1* | 11/2011 | Kubota | G02F 1/13394 349/43 |
| 2015/0301364 A1* | 10/2015 | Feng | G02F 1/13363 349/96 |

FOREIGN PATENT DOCUMENTS

| | | | | |
|---|---|---|---|---|
| CN | 102253541 | | 11/2011 | |
| CN | 103383505 | | 11/2013 | |
| CN | 103383505 A | * | 11/2013 | ........... G02F 1/1335 |
| CN | 103792742 | | 5/2014 | |
| JP | 11-174489 | | 7/1999 | |
| JP | 2006-195388 | | 7/2006 | |

OTHER PUBLICATIONS

Office action from Chinese application No. 201410033334.9 dated Nov. 3, 2015.

Office action from Chinese Application No. 20141003334.9 dated Feb. 5, 2016.

Office action from Chinese Application No. 2014 0033334.9 dated Jul. 15, 2016.

Li Wei Liu et al, "A viewing angle controllable blue-phase liquid-crystal display", J. Society for Information Display, vol. 20, issue 6, pp. 337-340, Jun. 2012 along with English abstract.

* cited by examiner

LIQUID CRYSTAL DISPLAY DEVICE

CROSS REFERENCE TO RELATED APPLICATIONS

This application is the U.S. national stage entry of PCT/CN2014/080850 with an international filing date of Jun. 26, 2014, which claims priority to and any other benefit of Chinese Application No. 201410033334 filed Jan. 23, 2014 and entitled "Liquid crystal display device," the entire disclosures of which are incorporated by reference herein.

FIELD OF THE INVENTION

The present invention relates to the display field, particularly to a liquid crystal display device.

BACKGROUND OF THE INVENTION

With the widespread application of liquid crystal display devices in life and work, people's requirement on the view of these liquid crystal display devices also becomes higher and higher. In order to increase the view of the liquid crystal display device, technologies such as Patterned Vertical Alignment (PVA) technology, Multi-domain Vertical Alignment (MVA) technology, and In-Plane Switching (IPS) technology are proposed successively. However, in reality, there are instances when the user would not like to share the same display image with others for the sake of privacy. For example, when the person uses a personal notebook computer in public, he or she may desire to have a smaller view to protect privacy. When a liquid crystal display is used by several people in a family, they may desire to have a relatively large view so as to be convenient for being used by many people. Therefore, there is need to provide a display device that can be switched between the wide view and the narrow view.

SUMMARY OF THE INVENTION (I) Technical Problem to be Solved

The technical problem to be solved by the present invention is to provide a liquid crystal display device capable of realizing switching between a wide view mode and a narrow view mode.

(II) Technical Solution

To solve the above technical problem, an embodiment of the present invention provides a liquid crystal display device comprising an upper polarizer, a lower polarizer and a first liquid crystal cell arranged between the upper polarizer and the lower polarizer, wherein a second liquid crystal cell is further arranged between the upper polarizer and the first liquid crystal cell, the second liquid crystal cell comprising a first electrode, a second electrode and a first liquid crystal layer arranged between the first electrode and the second electrode, the first liquid crystal layer being a blue phase liquid crystal layer, the first electrode and the second electrode being used for forming a vertical electric field.

According to an embodiment of the present invention, the first liquid crystal cell comprises a pixel electrode, a common electrode, a second liquid crystal layer as well as a first substrate and a second substrate arranged opposite to each other, the pixel electrode and the common electrode being arranged on top of the first substrate for forming a horizontal electric field, the horizontal electric field being used for controlling deflection of liquid crystal molecules in the second liquid crystal layer.

According to an embodiment of the present invention, the second liquid crystal cell further comprises a third substrate, the first electrode being arranged at the bottom of the third substrate, the second electrode being arranged on top of the second substrate.

According to an embodiment of the present invention, optical compensation films are further arranged at the bottom of the upper polarizer and on top of the lower polarizer.

According to an embodiment of the present invention, the optical compensation films are uniaxial compensation films or biaxial compensation films.

According to an embodiment of the present invention, the first liquid crystal cell is any one of an IPS liquid crystal cell, a MVA liquid crystal cell and a PVA liquid crystal cell.

According to an embodiment of the present invention, the liquid crystal display device further comprises a control circuit for applying a voltage to the first electrode and the second electrode based on a received control signal so as to generate the vertical electric field.

(III) Beneficial Effect

The liquid crystal display device provided by the embodiment of the present invention comprises a first liquid crystal cell and a second liquid crystal cell, the second liquid crystal cell comprising a first electrode, a second electrode and a blue phase liquid crystal layer arranged between the first electrode and the second electrode. When there is no vertical electric field between the first electrode and the second electrode, the liquid crystal display device is in a wide view mode. When a voltage is applied to the first electrode and the second electrode, a vertical electric field is generated between the first electrode and the second electrode, such that the blue phase liquid crystal of the blue phase liquid crystal layer generate anisotropy, thereby being capable of switching the liquid crystal display device from the wide view mode to the narrow view mode.

DETAILED DESCRIPTION OF THE INVENTION

Next, the present invention will be further described in detail in combination with the drawings and the embodiments. The following embodiments are used for explaining the present invention rather than limiting the scope of the present invention.

Figure 1:
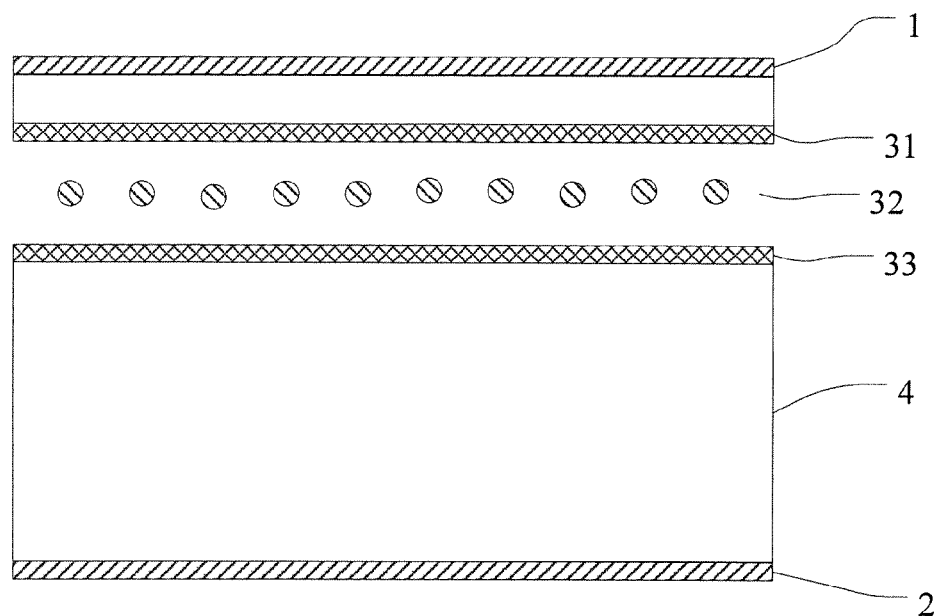
FIG. 1 is a schematic view of a liquid crystal display device according to an embodiment of the present invention.

FIG. 1 is a schematic view of a liquid crystal display device according to an embodiment of the present invention, comprising an upper polarizer 1, a lower polarizer 2 and a first liquid crystal cell 4 arranged between the upper polarizer 1 and the lower polarizer 2. The light emitted by the liquid crystal display device for example may be emitted outwards via the upper polarizer 1, and received and perceived by the user. Wherein, a second liquid crystal cell is further arranged between the upper polarizer 1 and the first liquid crystal cell 4, the second liquid crystal cell comprises a first electrode 31, a second electrode 33 and a first liquid crystal layer 32 arranged between the first electrode 31 and the second electrode 33, the first liquid crystal layer 32 is a blue phase liquid crystal layer, the first electrode 31 and the second electrode 33 are used for forming a vertical electric field, so as to control a view of the liquid crystal display device.

Wherein, the first liquid crystal cell may be a wide view liquid crystal cell, for example, it may be any one of an IPS liquid crystal cell, a MVA liquid crystal cell and a PVA liquid crystal cell. In order to enable the liquid crystal display device to switch from the wide view to the narrow view, as stated above, the second liquid crystal cell in the embodiment of the present invention may comprise a first liquid crystal layer, the first liquid crystal layer uses blue phase liquid crystal molecules, rather than conventional liquid crystal molecules. The conventional liquid crystal molecule per se has birefraction, and has different refractive indexes in different directions, so a refractive index difference exists when viewed from different angles of view. On the other hand, the blue phase liquid crystal molecule differs from it. When the blue phase liquid crystal molecule is in a normal state (not affected by an external electric field), it has the same refractive index in respective directions, i.e., it presents isotropy, hence, herein it may be equivalent to a sphere, i.e., no refractive index difference exists when viewed from different angles of view. When the blue phase liquid crystal molecule is affected by the external electric field, for example, when an electric field in the vertical direction is applied to it, the refractive index of the blue phase liquid crystal molecule in the direction of the applied electric field may be increased, which may be equivalent to being stretched from a sphere to a spheroid. Supposed that the spheroid is vertically placed, then, it is a sphere only when viewed from the vertical direction opposed to it, while it is a deformed spheroid when viewed from other directions. Therefore, when an electric field in the vertical direction is applied to the blue phase liquid crystal molecule, except for the vertical direction opposed to it, the refractive index difference exists in any other direction, i.e., anisotropy of refractive index exists. From the perspective of optics, if refractive index difference exists in the medium along the light propagation direction, an optical path difference will be generated. The optical path difference may be generally represented by $\Delta n*d$, wherein $\Delta n$ is the refractive index difference, and d is the thickness of the anisotropic medium through which the light passes.

As shown in FIG. 1, according to an embodiment of the present invention, when there is no vertical electric field between the first electrode 31 and the second electrode 33, the refractive index of the blue phase liquid crystals in the first liquid crystal layer is isotropic. Hence, when the liquid crystal display device is viewed from different angles, the optical path difference in a dark state is zero. Dark state light leakage will not be generated, i.e., normal presentation of the original bright and dark control of respective points on the liquid crystal display device is maintained. Normal contrast and image display are ensured, so that the liquid crystal display device is kept in the wide view mode.

Figure 2:
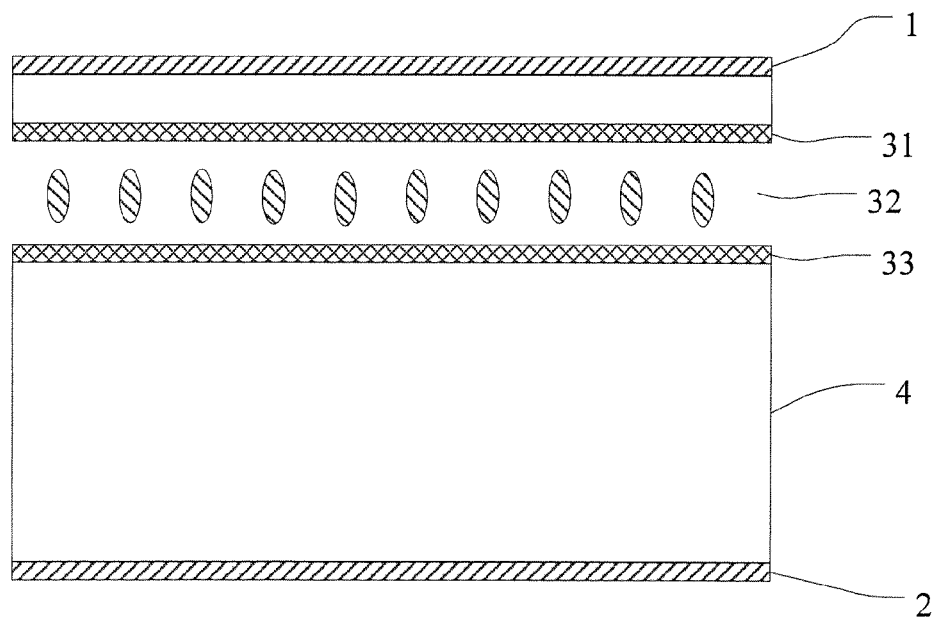
FIG. 2 is a schematic view of the liquid crystal display device as shown in FIG. 1 under the effect of a vertical electric field.

Referring to FIG. 2, when a voltage is applied to the first electrode 31 and the second electrode 33, a vertical electric field is generated between the first electrode 31 and the second electrode 33, such that the blue phase liquid crystals in the first liquid crystal layer are stretched from a sphere that represents the refractive index into a spheroid along the direction of the electric field. This stretching enables the blue phase liquid crystals to generate refractive index anisotropy, i.e., except for the direction opposed to the liquid crystal panel. When viewing the panel from an oblique direction, due to the refractive index difference, the optical path difference may be different when viewed from different angles of view, thereby resulting in occurrence of dark state light leakage. Here, the original dark points might be displayed as bright points, thereby resulting in serious reduction of the image contrast from an oblique view. In this way, after the vertical electric field is generated by applying a voltage to the first electrode 31 and the second electrode 33, the image contrast from the oblique view might be greatly reduced. As a result the visible view of the whole liquid crystal display image becomes narrow, thereby realizing switching from the wide view to the narrow view.

Figure 3:
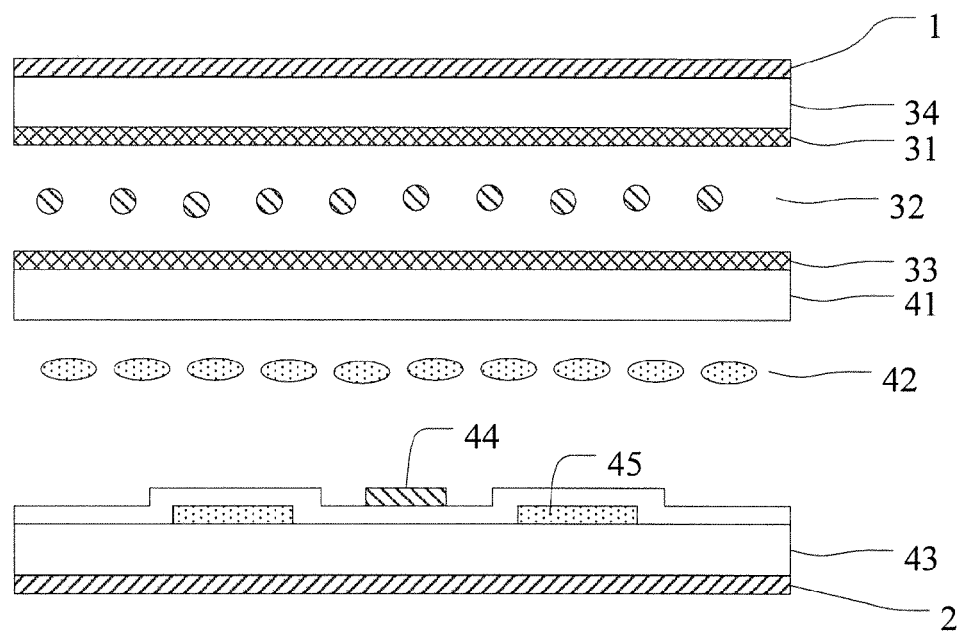
FIG. 3 is a schematic view of another liquid crystal display device according to an embodiment of the present invention.

According to an embodiment of the present invention, the first liquid crystal cell may be any one of an IPS liquid crystal cell, a MVA liquid crystal cell and a PVA liquid crystal cell. By way of example, referring to FIG. 3, in one embodiment of the present invention the first liquid crystal cell is an IPS liquid crystal cell. FIG. 3 is a schematic view of another liquid crystal display device according to an embodiment of the present invention, comprising a first liquid crystal cell and a second liquid crystal cell. The first liquid crystal cell comprises a pixel electrode 44, a common electrode 45, a second liquid crystal layer 42 as well as a first substrate 43 and a second substrate 41 arranged opposite to each other. The pixel electrode 44 and the common electrode 45 are arranged on top of the first substrate 43 for forming a horizontal electric field, and the horizontal electric field is used for controlling deflection of liquid crystal molecules in the second liquid crystal layer 42.

Figure 4:
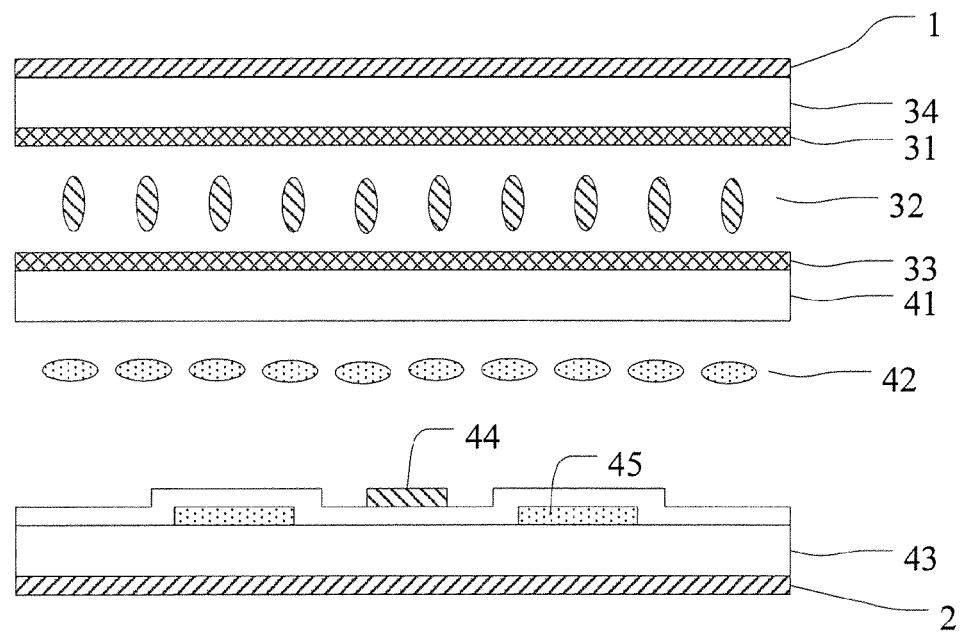
FIG. 4 is a schematic view of the liquid crystal display device as shown in FIG. 3 under the effect of a vertical electric field.

Wherein, the second liquid crystal cell comprises a first electrode 31, a second electrode 33 and a first liquid crystal layer 32 arranged between the first electrode 31 and the second electrode 33. The first liquid crystal layer 32 is a blue phase liquid crystal layer. The second liquid crystal cell further comprises a third substrate 34, the first electrode 31 is arranged at the bottom of the third substrate 34, and the second electrode 33 is arranged on top of the second substrate 41, i.e., here the first liquid crystal cell and the second liquid crystal cell share the second substrate 41. Specifically, the liquid crystal display device may further comprise a control circuit (not shown in the figure) for applying a voltage to the first electrode and the second electrode based on a received control signal (for example, a view conversion signal inputted by the user), so as to generate the vertical electric field. For example, when the user desires a wide view, the user may for example send via an user interface a first control signal representative of selection of the wide view mode to the control circuit, such that the control circuit will not apply a voltage to the first electrode and the second electrode, no vertical electric field exists between the first electrode and the second electrode, the refractive index of the blue phase liquid crystal in the first liquid crystal layer is isotropic without the effect of the vertical electric field, so the first liquid crystal cell will not generate dark state light leakage from respective directions, and still has consistent contrast, the view is not affected. When the user desires to switch it to the narrow view, the user may for example send via the user interface a second control signal representative of selection of the narrow view mode to the control circuit, such that the control circuit applies a voltage to the first electrode and the second electrode, a vertical electric field is generated between the first electrode and the second electrode. Referring to FIG. 4, the blue phase liquid crystals in the first liquid crystal layer are stretched from a sphere that represents the refractive index into a spheroid along the direction of the electric field under the effect of the vertical electric field, which is equivalent to being converted into vertically orientated nematic liquid crystals. Here, the light emitted from the first liquid crystal cell, when viewed from the normal view, will not generate dark state light leakage since there is no optical path difference in the blue phase liquid crystal layer. However, when viewed from the oblique view, the dark state light leakage will be generated due to existence of the refractive index difference, which results in serious reduction of the image contrast in the oblique view, i.e., the visible view of the whole liquid crystal display image becomes narrow, thereby realizing switching from the wide view to the narrow view.

According to another embodiment of the present invention, optical compensation films are further arranged at the bottom of the upper polarizer 1 and on top of the lower polarizer 2, wherein the optical compensation films may be uniaxial compensations film or biaxial compensation films.

The liquid crystal display device according to the embodiment of the present invention comprises a first liquid crystal cell and a second liquid crystal cell, the second liquid crystal cell comprising a first electrode, a second electrode and a blue phase liquid crystal layer arranged between the first electrode and the second electrode. When there is no vertical electric field between the first electrode and the second electrode, the liquid crystal display device is in a wide view mode, and when a voltage is applied to the first electrode and the second electrode, a vertical electric field is generated between the first electrode and the second electrode, such that the blue phase liquid crystals of the blue phase liquid crystal layer generate anisotropy, thereby being capable of switching the liquid crystal display device from the wide view mode to the narrow view mode. In addition, the operation of switching between the wide view mode and the narrow view mode carried out in the above way is simple and has a relatively high feasibility.

The above embodiments are only used for explaining the present invention, rather than limitations to the present invention. The ordinary skilled person in the related technical field may further make various modifications and variants without departing from the spirit and scope of the present invention. Therefore, all the equivalent technical solutions also belong to the scope of the present invention. The protection scope of the present invention should be defined by claims.

The invention claimed is:

1. A liquid crystal display device comprising:
   an upper polarizer, a lower polarizer and a first liquid crystal cell arranged between the upper polarizer and the lower polarizer,
   wherein a second liquid crystal cell is further arranged between the upper polarizer and the first liquid crystal cell, the second liquid crystal cell comprising a first electrode, a second electrode and a first liquid crystal layer arranged between the first electrode and the second electrode,
   wherein the first liquid crystal layer is a blue phase liquid crystal layer, and
   the first electrode and the second electrode are used for forming a vertical electric field that enables the blue phase liquid crystal layer to generate refractive index anisotropy.

2. The liquid crystal display device according to claim 1, wherein
   the first liquid crystal cell comprises a pixel electrode, a common electrode, a second liquid crystal layer as well as a first substrate and a second substrate arranged opposite to each other,
   the pixel electrode and the common electrode are arranged on top of the first substrate for forming a horizontal electric field, and
   the horizontal electric field is used for controlling deflection of liquid crystal molecules in the second liquid crystal layer.

3. The liquid crystal display device according to claim 2, wherein
   the second liquid crystal cell further comprises a third substrate,
   the first electrode is arranged at the bottom of the third substrate, and
   the second electrode is arranged on top of the second substrate.

4. The liquid crystal display device according to claim 3, further comprising a control circuit for applying a voltage to the first electrode and the second electrode based on a received control signal so as to generate the vertical electric field.

5. The liquid crystal display device according to claim 2, further comprising a control circuit for applying a voltage to the first electrode and the second electrode based on a received control signal so as to generate the vertical electric field.

6. The liquid crystal display device according to claim 1, wherein optical compensation films are further arranged at the bottom of the upper polarizer and on top of the lower polarizer.

7. The liquid crystal display device according to claim 6, wherein the optical compensation films are uniaxial compensation films or biaxial compensation films.

8. The liquid crystal display device according to claim 7, further comprising a control circuit for applying a voltage to the first electrode and the second electrode based on a received control signal so as to generate the vertical electric field.

9. The liquid crystal display device according to claim 6, further comprising a control circuit for applying a voltage to the first electrode and the second electrode based on a received control signal so as to generate the vertical electric field.

10. The liquid crystal display device according to claim 1, wherein the first liquid crystal cell is any one of an IPS liquid crystal cell, a MVA liquid crystal cell, and a PVA liquid crystal cell.

11. The liquid crystal display device according to claim 10, further comprising a control circuit for applying a voltage to the first electrode and the second electrode based on a received control signal so as to generate the vertical electric field.

12. The liquid crystal display device according to claim 1, further comprising a control circuit for applying a voltage to the first electrode and the second electrode based on a received control signal so as to generate the vertical electric field.

* * * * *